US012632356B2

(12) United States Patent
Zhao et al.

(10) Patent No.: US 12,632,356 B2
(45) Date of Patent: May 19, 2026

(54) METHOD, APPARATUS AND SYSTEM FOR MONITORING POWER CONSUMPTION OF SERVER, ELECTRONIC DEVICE AND STORAGE MEDIUM

(71) Applicant: SUZHOU METABRAIN INTELLIGENT TECHNOLOGY CO., LTD., Suzhou (CN)

(72) Inventors: Guoling Zhao, Suzhou (CN); Qiuyun Shi, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/140,436

(22) PCT Filed: Jun. 21, 2024

(86) PCT No.: PCT/CN2024/100755
§ 371 (c)(1),
(2) Date: Jun. 18, 2025

(87) PCT Pub. No.: WO2025/081880
PCT Pub. Date: Apr. 24, 2025

(65) Prior Publication Data
US 2026/0119357 A1 Apr. 30, 2026

(30) Foreign Application Priority Data
Oct. 17, 2023 (CN) .......................... 202311344863.6

(51) Int. Cl.
*G06F 11/30* (2006.01)
(52) U.S. Cl.
CPC ................................ *G06F 11/3062* (2013.01)
(58) Field of Classification Search
None
See application file for complete search history.

(56) References Cited

U.S. PATENT DOCUMENTS 7,501,879 B1 * 3/2009 Oh ........................ G11C 17/16
365/225.7
11,451,046 B2 * 9/2022 Logan ..................... H02H 7/26
(Continued)

FOREIGN PATENT DOCUMENTS

CN 109976465 A 7/2019
CN 112014629 A 12/2020
(Continued)

OTHER PUBLICATIONS

EFuse ICs Enhancing Protection of Power Supply Lines in Compliance (Year: 2021).*
(Continued)

*Primary Examiner* — Kim Huynh
(74) *Attorney, Agent, or Firm* — IPro, PLLC

(57) ABSTRACT

The present disclosure discloses a method for monitoring power consumption of a server. The method is applied to a system for monitoring power consumption of the server, which includes a computer power supply unit, a first one-time programmable memory, a second one-time programmable memory, a first server plug-in and a second server plug-in, the method including: obtaining a power supply voltage signal of the computer power supply unit; performing sampling voltage signal conversion to obtain a first sampling voltage signal; obtaining a first analog output voltage signal of the first one-time programmable memory; performing sampling current signal conversion according to the first analog output voltage signal to obtain a first sampling current signal; generating server power consumption according to the first sampling current signal and the first sampling voltage signal; performing server power consumption monitoring according to the server power consumption to obtain a server power consumption monitoring result.

20 Claims, 6 Drawing Sheets

(56) References Cited

U.S. PATENT DOCUMENTS

| | | | |
|---|---|---|---|
| 2012/0203481 A1* | 8/2012 | Carpenter | G01R 21/133 |
| | | | 324/156 |
| 2013/0191664 A1 | 7/2013 | Archibald et al. | |
| 2022/0283960 A1 | 9/2022 | Long et al. | |
| 2022/0317751 A1 | 10/2022 | Samuel et al. | |
| 2023/0187922 A1* | 6/2023 | Randazzo | H02H 5/048 |
| | | | 361/87 |

FOREIGN PATENT DOCUMENTS

| | | |
|---|---|---|
| CN | 113866498 A | 12/2021 |
| CN | 116303193 A | 6/2023 |
| CN | 117076261 A | 11/2023 |

OTHER PUBLICATIONS

Simplifying Radiation-hardened Power-supply Design with eFuses (Year: 2023).*

* cited by examiner

104

141

The first Imon voltage signal is converted through a second operational amplifier circuit to obtain the first ISense current signal

Operational amplification processing is performed on the PSU voltage signal through the first operational amplifier circuit to obtain a first operational amplification result

123

Conversion processing is performed on the first operational amplification result through a first MOS transistor and a first mirror current source to obtain the first VSense voltage signal

FIG. 5

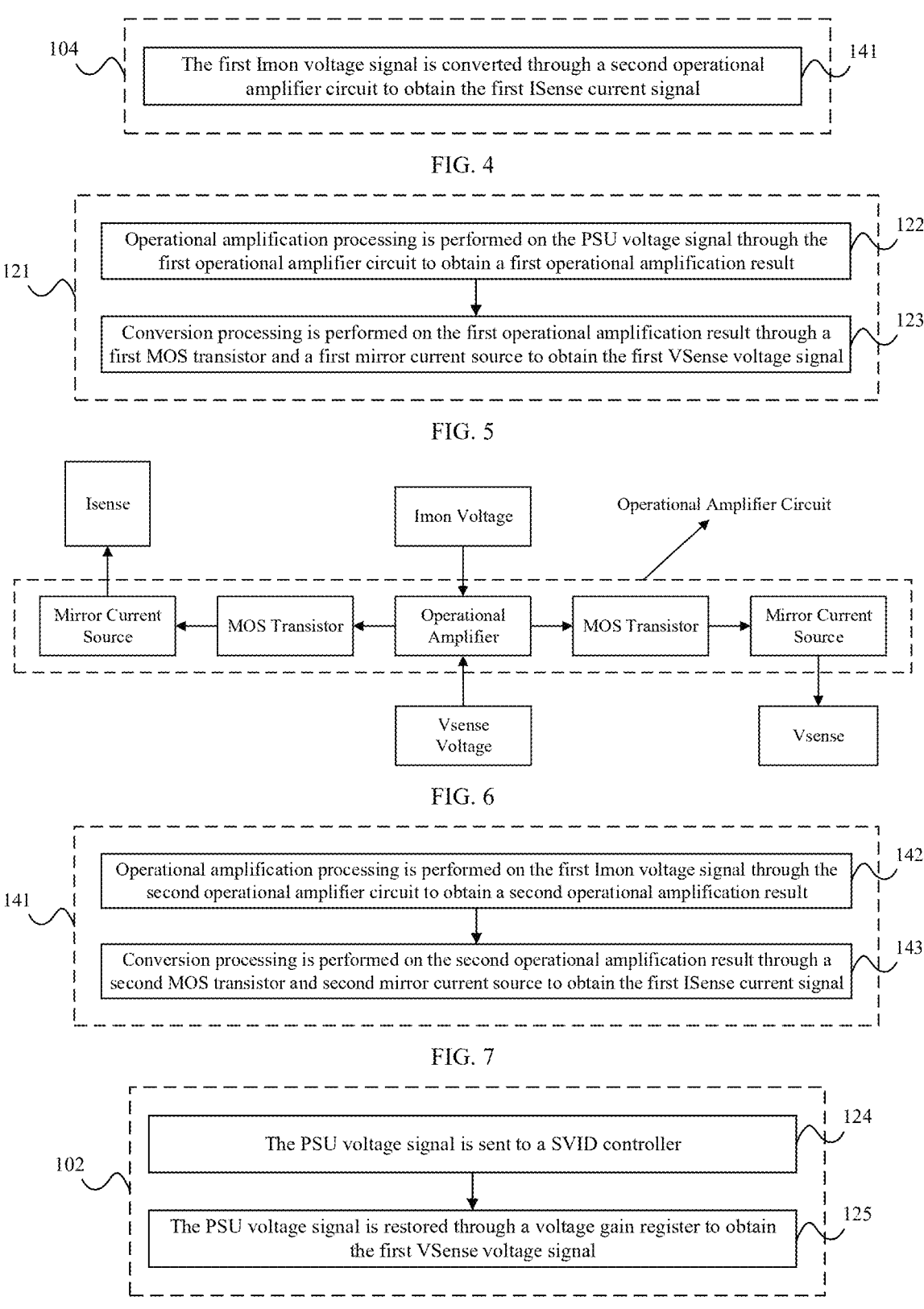

Operational amplification processing is performed on the first Imon voltage signal through the second operational amplifier circuit to obtain a second operational amplification result

143

Conversion processing is performed on the second operational amplification result through a second MOS transistor and second mirror current source to obtain the first ISense current signal

The PSU voltage signal is sent to a SVID controller

125

The PSU voltage signal is restored through a voltage gain register to obtain the first VSense voltage signal

FIG. 8

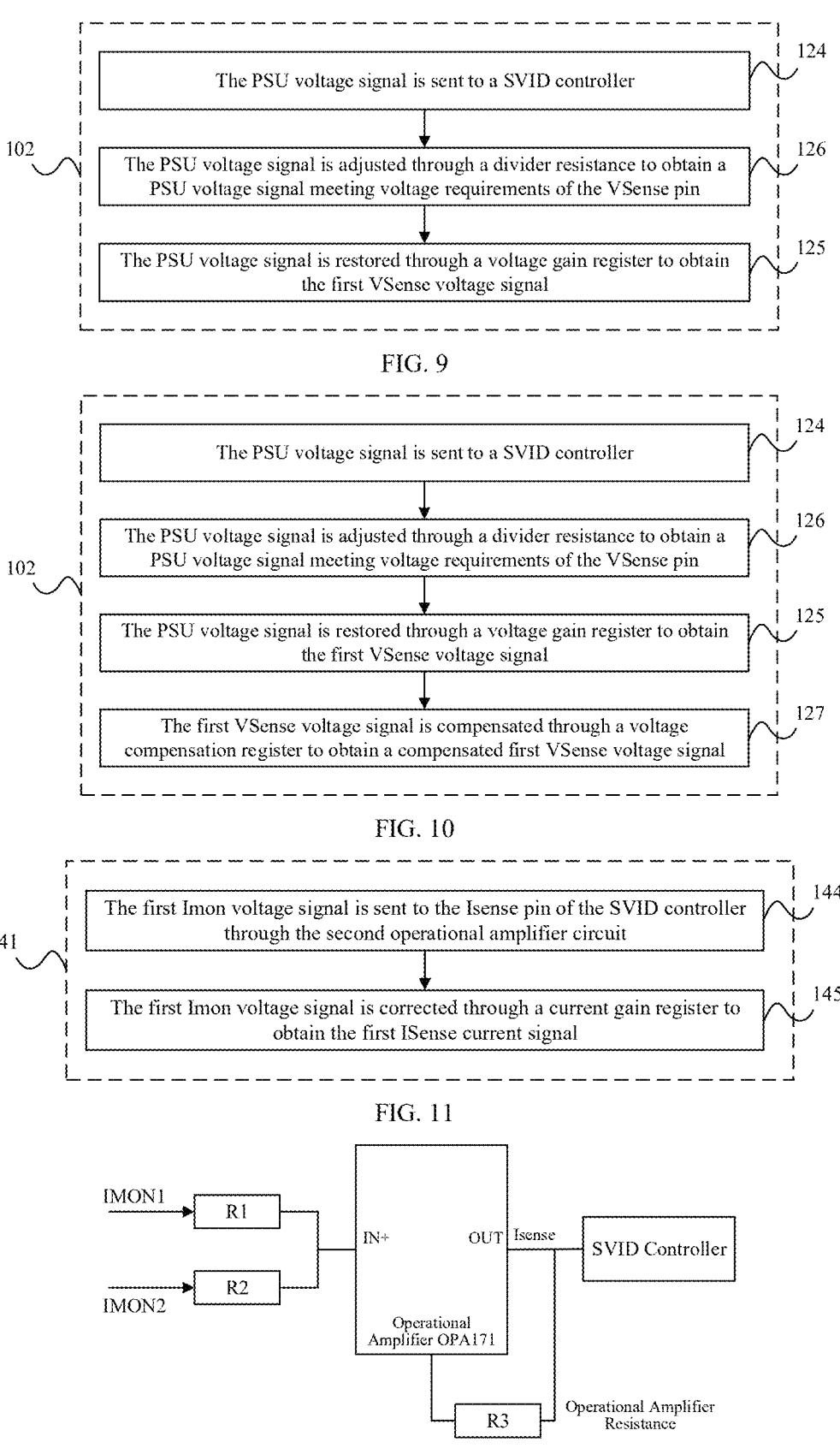

The PSU voltage signal is sent to a SVID controller                                    124

102

The PSU voltage signal is adjusted through a divider resistance to obtain a
PSU voltage signal meeting voltage requirements of the VSense pin                      126

The PSU voltage signal is restored through a voltage gain register to obtain
the first VSense voltage signal                                                       125

FIG. 9

The PSU voltage signal is sent to a SVID controller                                    124

The PSU voltage signal is adjusted through a divider resistance to obtain a
PSU voltage signal meeting voltage requirements of the VSense pin                      126

102

The PSU voltage signal is restored through a voltage gain register to obtain
the first VSense voltage signal                                                        125

The first VSense voltage signal is compensated through a voltage
compensation register to obtain a compensated first VSense voltage signal             127

FIG. 10

The first Imon voltage signal is sent to the Isense pin of the SVID controller
through the second operational amplifier circuit                                       144

141

The first Imon voltage signal is corrected through a current gain register to
obtain the first ISense current signal                                                145

FIG. 11

IMON1 — R1 — IN+    OUT  Isense — SVID Controller

IMON2 — R2

Operational
Amplifier OPA171

R3    Operational Amplifier
      Resistance

FIG. 12

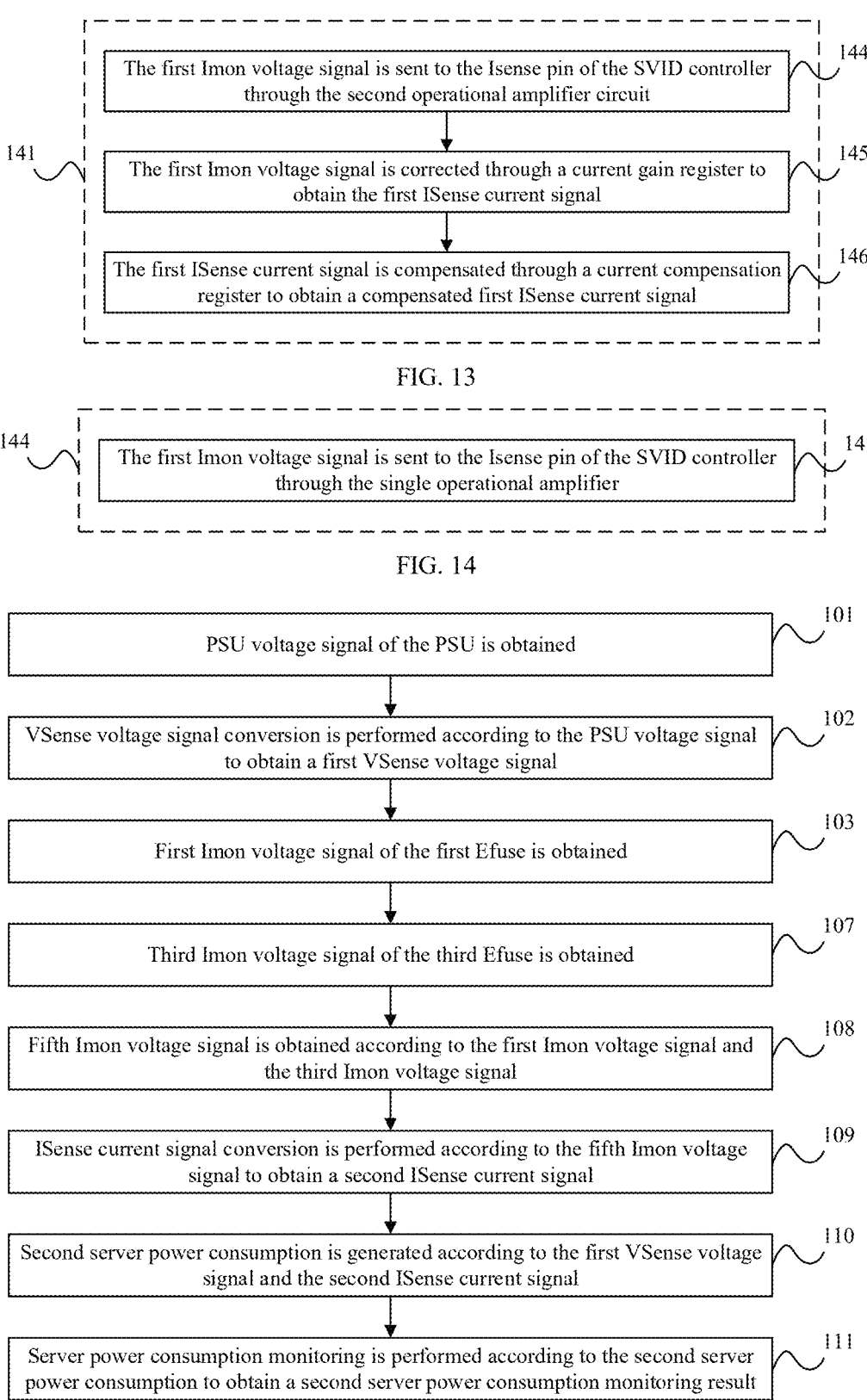

The first Imon voltage signal is sent to the Isense pin of the SVID controller through the second operational amplifier circuit — 144

The first Imon voltage signal is corrected through a current gain register to obtain the first ISense current signal — 145

The first ISense current signal is compensated through a current compensation register to obtain a compensated first ISense current signal — 146

The first Imon voltage signal is sent to the Isense pin of the SVID controller through the single operational amplifier — 147

PSU voltage signal of the PSU is obtained — 101

VSense voltage signal conversion is performed according to the PSU voltage signal to obtain a first VSense voltage signal — 102

First Imon voltage signal of the first Efuse is obtained — 103

Third Imon voltage signal of the third Efuse is obtained — 107

Fifth Imon voltage signal is obtained according to the first Imon voltage signal and the third Imon voltage signal — 108

ISense current signal conversion is performed according to the fifth Imon voltage signal to obtain a second ISense current signal — 109

Second server power consumption is generated according to the first VSense voltage signal and the second ISense current signal — 110

Server power consumption monitoring is performed according to the second server power consumption to obtain a second server power consumption monitoring result — 111

FIG. 15

METHOD, APPARATUS AND SYSTEM FOR MONITORING POWER CONSUMPTION OF SERVER, ELECTRONIC DEVICE AND STORAGE MEDIUM

CROSS-REFERENCE TO RELATED APPLICATION

The present disclosure claims the priority of Chinese patent application number 202311344863.6, filed with the CNIPA, China National Intellectual Property Administration, on Oct. 17, 2023, and entitled "METHOD, APPARATUS AND SYSTEM FOR MONITORING POWER CONSUMPTION OF SERVER, ELECTRONIC DEVICE AND STORAGE MEDIUM", which is incorporated herein in its entirety by reference.

FIELD

The present disclosure relates to the field of computer technologies, and more particularly to a method, an apparatus and a system for monitoring power consumption of a server, an electronic device and a non-transitory readable storage medium.

BACKGROUND

With the development of technologies, power consumption of a server is gradually increasing. The sudden increase of the power consumption when frequency hopping occurs may cause downtime of a power supply unit (PSU), thereby affecting the normal use of the server.

In the related art, an Imon voltage of an electronic fuse (Efuse) and a voltage of the PSU are often monitored to achieve an overall monitoring effect of the server. However, in this kind of monitoring circuit, Efuses connected to different plug-ins of the server are all powered by the PSU. For a parallel connection manner, it is necessary to perform a load test on each of the Efuses during the test. When a load proportional distribution changes, the Imon voltage of the Efuse changes accordingly, so that the accuracy of power consumption monitoring is low, and the monitoring effect is poor.

SUMMARY

The present disclosure provides a method, an apparatus and a system for monitoring power consumption of a server, an electronic device and a non-transitory readable storage medium. The mode that a one-time programmable memory supplies power to one or more plug-ins of the server and one or more other one-time programmable memories at the same time avoids the problem of load proportional distribution. In addition, an analog output voltage of the one-time programmable memory will not change due to the load proportional distribution or the change of load solution, thereby solving the problems of low accuracy and poor effect of power consumption monitoring caused by inaccurate calculation of power consumption of the server.

In a first aspect, the present disclosure provides a method for monitoring power consumption of a server, applied to a system for monitoring power consumption of a server, which includes a computer power supply unit, a first one-time programmable memory, a second one-time programmable memory, a first server plug-in and a second server plug-in, where the computer power supply unit is configured to supply power to the first one-time programmable memory, the first one-time programmable memory is configured to supply power to the second one-time programmable memory and the first server plug-in, and the second one-time programmable memory is configured to supply power to the second server plug-in, and the method includes:

obtaining a power supply voltage signal of the computer power supply unit;

performing sampling voltage signal conversion according to the power supply voltage signal to obtain a first sampling voltage signal;

obtaining a first analog output voltage signal of the first one-time programmable memory;

performing sampling current signal conversion according to the first analog output voltage signal to obtain a first sampling current signal;

generating server power consumption according to the first sampling current signal and the first sampling voltage signal; and performing server power consumption monitoring according to the server power consumption to obtain a server power consumption monitoring result.

In some embodiments, the method for monitoring the power consumption of the server provided in the present disclosure further includes:

converting the power supply voltage signal through a first operational amplifier circuit to obtain the first sampling voltage signal.

In some embodiments, the method for monitoring the power consumption of the server provided in the present disclosure further includes:

converting the first analog output voltage signal through a second operational amplifier circuit to obtain the first sampling current signal.

In some embodiments, the method for monitoring the power consumption of the server provided in the present disclosure further includes:

performing operational amplification processing on the power supply voltage signal through the first operational amplifier circuit to obtain a first operational amplification result; and performing conversion processing on the first operational amplification result through a first field effect transistor and a first mirror current source to obtain the first sampling voltage signal.

In some embodiments, the method for monitoring the power consumption of the server provided in the present disclosure further includes:

performing operational amplification processing on the first analog output voltage signal through the second operational amplifier circuit to obtain a second operational amplification result; and performing conversion processing on the second operational amplification result through a second field effect transistor and a second mirror current source to obtain the first sampling current signal.

In some embodiments, the method for monitoring the power consumption of the server provided in the present disclosure further includes:

sending the power supply voltage signal to a serial voltage identification controller; and restoring the power supply voltage signal through a voltage gain register to obtain the first sampling voltage signal.

In some embodiments, the method for monitoring the power consumption of the server provided in the present disclosure further includes:

adjusting the power supply voltage signal through a divider resistance to obtain a power supply voltage signal meeting voltage requirements of the sampling voltage pin.

In some embodiments, the method for monitoring the power consumption of the server provided in the present disclosure further includes:

compensating the first sampling voltage signal through a voltage compensation register to obtain a compensated first sampling voltage signal.

In some embodiments, the method for monitoring the power consumption of the server provided in the present disclosure further includes:

sending the first analog output voltage signal to the sampling current pin of the serial voltage identification controller through the second operational amplifier circuit; and correcting the first analog output voltage signal through a current gain register to obtain the first sampling current signal.

In some embodiments, the method for monitoring the power consumption of the server provided in the present disclosure further includes:

compensating the first sampling current signal through a current compensation register to obtain a compensated first sampling current signal.

In some embodiments, the method for monitoring the power consumption of the server provided in the present disclosure further includes:

sending the first analog output voltage signal to the sampling current pin of the serial voltage identification controller through the single operational amplifier.

In some embodiments, the method for monitoring the power consumption of the server provided in the present disclosure further includes:

obtaining a third analog output voltage signal of the third one-time programmable memory;

obtaining a fifth analog output voltage signal according to the first analog output voltage signal and the third analog output voltage signal;

performing sampling current signal conversion according to the fifth analog output voltage signal to obtain a second sampling current signal;

generating second server power consumption according to the first sampling voltage signal and the second sampling current signal; and performing server power consumption monitoring according to the second server power consumption to obtain a second server power consumption monitoring result.

In some embodiments, the method for monitoring the power consumption of the server provided in the present disclosure further includes:

adding the first analog output voltage signal and the third analog output voltage signal through an adder to obtain the fifth analog output voltage signal.

In some embodiments, the method for monitoring the power consumption of the server provided in the present disclosure further includes:

obtaining a server monitoring current according to the first sampling current signal;

obtaining a server monitoring voltage according to the first sampling voltage signal; and generating the server power consumption according to the server monitoring current and the server monitoring voltage.

In some embodiments, in the method for monitoring the power consumption of the server provided in the present disclosure, the first server plug-in includes at least one of a central processing unit (CPU), a graphics processing unit (GPU), a network card, a fan or a backplane.

In some embodiments, the method for monitoring the power consumption of the server provided in the present disclosure further includes:

determining the server power consumption and a preset power threshold to obtain a power determination result; and performing frequency reduction processing on the server to obtain the server power consumption monitoring result when the power determination result is that the server power consumption is greater than the power threshold.

In a second aspect, the present disclosure further provides an apparatus for monitoring power consumption of a server, including:

a computer power supply unit voltage obtaining module configured to obtain a power supply voltage signal of a computer power supply unit;

a first sampling voltage conversion module configured to perform sampling voltage signal conversion according to the power supply voltage signal to obtain a first sampling voltage signal;

a first analog output voltage obtaining module configured to obtain a first analog output voltage signal of the first one-time programmable memory;

a first sampling current conversion module configured to perform sampling current signal conversion according to the first analog output voltage signal to obtain a first sampling current signal;

a power consumption calculation module configured to generate server power consumption according to the first sampling current signal and the first sampling voltage signal; and a power consumption monitoring module configured to perform server power consumption monitoring according to the server power consumption to obtain a server power consumption monitoring result.

In a third aspect, the present disclosure further provides a system for monitoring power consumption of a server, including:

a computer power supply unit module configured to supply power to a first one-time programmable memory module, and send a power supply voltage signal to a first operational amplifier circuit conversion module;

the first one-time programmable memory module configured to supply power to a second one-time programmable memory module and a first server plug-in, and send a first analog output voltage signal to a second operational amplifier circuit conversion module, where the first analog output voltage signal includes a second analog output voltage signal corresponding to the second one-time programmable memory module and a third analog output voltage signal corresponding to the first server plug-in;

the second one-time programmable memory module configured to supply power to a second server plug-in;

the first operational amplifier circuit conversion module configured to perform sampling voltage signal conversion on the power supply voltage signal to obtain a first sampling voltage signal, and send the first sampling voltage signal to a serial voltage identification controller;

the second operational amplifier circuit conversion module configured to perform sampling current signal conversion on the first analog output voltage signal to obtain a first sampling current signal, and send the first sampling current signal to the serial voltage identification controller; and the serial voltage identification controller configured to generate first server power consumption according to the first sampling current signal and the first sampling voltage signal, and monitor the first server power consumption to obtain a first server power consumption monitoring result.

In a fourth aspect, the present disclosure further provides a server, where the system for monitoring the power consumption of the server in the third aspect is arranged in the server.

In a fifth aspect, the present disclosure further provides an electronic device. The electronic device includes a processor and a memory, where the memory stores programs or instructions that are capable of running on the processor, and the programs or the instructions, when executed by the processor, cause the processor to implement the method for monitoring the power consumption of the server in the first aspect.

In a sixth aspect, the embodiments of the present disclosure further provides a non-transitory readable storage medium storing a computer program, where the computer program, when executed by a processor, causes the processor to implement the method for monitoring the power consumption of the server in the first aspect.

In technical solutions provided in the present disclosure, the power supply architecture adopts the mode that a one-time programmable memory supplies power to one or more plug-ins of the server and one or more other one-time programmable memories at the same time, so that the sum of the voltages of the plug-ins of the server and other one-time programmable memories supplied by the one-time programmable memory may be obtained by obtaining the voltage of the one-time programmable memory, and it is not necessary to perform current proportional distribution on a plurality of one-time programmable memories during the circuit test, thereby avoiding the interference of unreasonable distribution on the analog output voltage, simplifying the test difficulty and improving the test accuracy.

In addition, when monitoring the power consumption of the server, it is only necessary to monitor a one-time programmable memory, thereby reducing the welding of load lines, reducing the number of load meters, and further reducing the cost of circuit test.

The above description is only an overview of the technical solutions provided in the present disclosure. In order to understand technical means of the present disclosure more clearly, it may be implemented according to contents of the specification, and in order to make the above and other objects, features and advantages of the present disclosure more obvious and easier to understand, some embodiments of the present disclosure are listed below.

BRIEF DESCRIPTION OF THE DRAWINGS

One or more embodiments are illustrated by corresponding figures in the accompanying drawings, which do not constitute a limitation of the embodiments. Elements with the same reference numbers in the accompanying drawings are represented as similar elements, and unless otherwise specified, the figures in the accompanying drawings do not constitute a scale limitation.

FIG. 4 is a schematic diagram of still another method for monitoring power consumption of a server provided in an embodiment of the present disclosure.

FIG. 5 is a schematic diagram of yet another method for monitoring power consumption of a server provided in an embodiment of the present disclosure.

FIG. 6 is an example of an operational amplifier circuit provided in the present disclosure.

FIG. 7 is a schematic diagram of yet another method for monitoring power consumption of a server provided in an embodiment of the present disclosure.

FIG. 8 is a schematic diagram of yet another method for monitoring power consumption of a server provided in an embodiment of the present disclosure.

FIG. 9 is a schematic diagram of yet another method for monitoring power consumption of a server provided in an embodiment of the present disclosure.

FIG. 10 is a schematic diagram of yet another method for monitoring power consumption of a server provided in an embodiment of the present disclosure.

FIG. 11 is a schematic diagram of yet another method for monitoring power consumption of a server provided in an embodiment of the present disclosure.

FIG. 12 is an example of an Isense optimization circuit provided in the present disclosure.

FIG. 13 is a schematic diagram of yet another method for monitoring power consumption of a server provided in an embodiment of the present disclosure.

FIG. 14 is a schematic diagram of yet another method for monitoring power consumption of a server provided in an embodiment of the present disclosure.

FIG. 15 is a schematic diagram of yet another method for monitoring power consumption of a server provided in an embodiment of the present disclosure.

DETAILED DESCRIPTION

Figure 1:
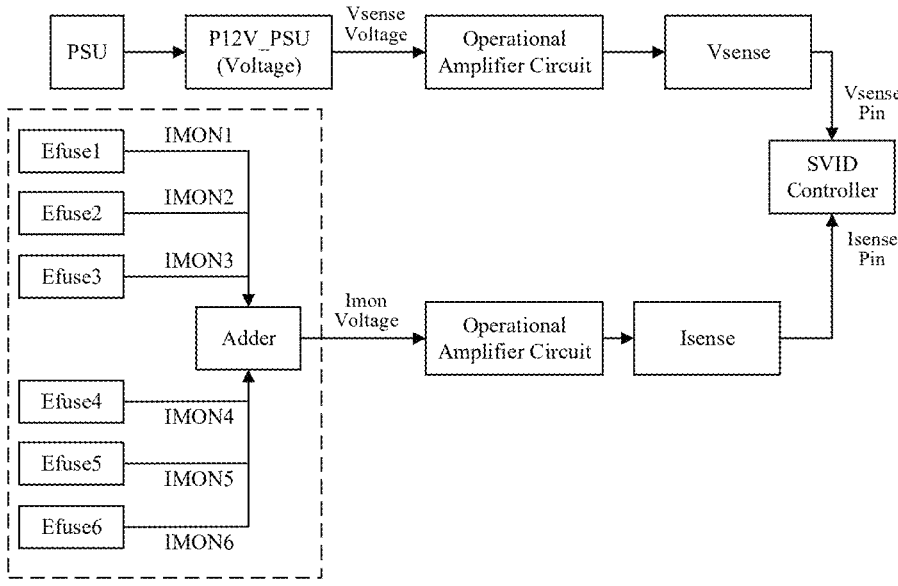
FIG. 1 is an example of an existing server power consumption monitoring.

Exemplary embodiments of the present disclosure will be described in more detail below with reference to the accompanying drawings. Although the exemplary embodiments of the present disclosure are shown in the accompanying drawings, it should be understood that the present disclosure may be implemented in various forms and should not be limited by the embodiments set forth herein. On the contrary, these embodiments are provided for a more thorough understanding of the present disclosure and will fully convey the scope of the present disclosure to a person skilled in the art.

The terms "first" and "second" in the specification and claims of the present disclosure are used to distinguish similar objects, and are not used to describe a specific order or sequence. It should be understood that data used in this way can be interchanged under appropriate circumstances, so that the embodiments of the present disclosure can be implemented in an order other than those illustrated or described here, and the objects distinguished by "first", "second", and the like are usually one class, and a number of objects is not limited, for example, a first object can be one or a plurality. In addition, "and/or" in the specification and claims means at least one of the connected objects, and the character "/" generally means that the contextual objects are in an "or" relationship.

First of all, following concepts are explained in the present disclosure. A power supply unit (PSU), also known as a computer power supply unit, is a kind of power supply in a computer that is different from a power supply capable of converting electric energy or supplying power, and is responsible for converting standard alternating current into low-voltage stable direct current for other components in the computer. An Efuse is also referred to as a one-time programmable memory. Compared with a static random-access memory (SRAM) array used in most field-programmable gate arrays (FPGAs), only one fuse in the Efuse is capable of being programmed at a time. When the Efuse is combined with an increasingly mature built-in self-testing engine, the cost of testing and self-repair may be significantly reduced. A VSense voltage signal is a sampling voltage signal when performing the overall power consumption monitoring of a server in the present disclosure, and an ISense current signal is a sampling current signal when performing the overall power consumption monitoring of the server in the present disclosure. An Imon voltage signal is an analog output voltage signal in the present disclosure. A MOS transistor is a field effect transistor, which is referred to as metal-oxide-semiconductor field effect transistor. A serial voltage identification (SVID) controller is also referred to as a serial voltage identification controller.

During the operation, due to the interference of frequency hopping and other unexpected situations, the power consumption of the server suddenly increases, which interferes with the operation of the server itself, such as a downtime problem when the power supply of the PSU is insufficient. Therefore, it is necessary to performing the overall power consumption monitoring of the server and make adaptive adjustments during the operation, for example, reducing the power consumption through CPU frequency reduction to avoid the downtime of the PSU.

As shown in FIG. 1, in the related art, by monitoring an Imon voltage of one or more Efuses as a monitoring current, and monitoring a voltage of a PSU as a monitoring voltage, overall power consumption of a server may be obtained in real time. For example, a plurality of Efuses such as Efuse1, Efuse2, Efuse3, Efuse4, Efuse5 and Efuse6 supply power to a server plug-in device, for example, a central processing unit (CPU), a graphics processing unit (GPU), and the like; after obtaining a plurality of Imon voltages such as Imon1 voltage, Imon2 voltage, Imon3 voltage, Imon4 voltage, Imon5 voltage and Imon6 voltage corresponding to the plurality of Efuses, a total voltage such as an Imon voltage is obtained through an adder, and a current signal such as an ISense current signal is generated through an operational amplifier circuit, then the current signal is sent to an Isense pin of a SVID controller; at the same time, a VSense voltage is determined according to a voltage of a PSU, for example, a P12V_PSU voltage, and a voltage signal such as a VSense voltage signal is generated through an operational amplifier circuit, then the current signal is sent to a VSense pin of the SVID controller, and then the overall power consumption of the server may be obtained for power consumption monitoring.

However, in the design of the existing Efuse architecture, voltages of server plug-ins corresponding to a plurality of groups of Efuses are monitored by the plurality of groups of Efuses and summarized by the adder, and then signal conversion is performed by the operational amplifier circuit. During the test, it is necessary to perform a load test on all Efuses, and a plurality of load meters are used to operate at the same time. Since it is not easy to distribute a load proportion of each Efuse at the same time, and load distribution solutions are different, Imon voltages obtained by the adder are different. Therefore, a power supply framework is not suitable, the test operation is complicated, there are many test devices, the load proportional distribution is complicated, an error after the adder is large, and the monitoring effect is poor.

Moreover, in the related art, it is necessary to use the adder, the operational amplifier circuits or the operational amplifiers, the MOS transistors and current mirror circuits to convert the Imon voltage signal into the ISense current signal, and convert the PSU voltage into the VSense voltage signal. Since there are errors in the components themselves, there are too many components, and the greater the difference between boards, the higher the monitoring cost.

According to a method for monitoring power consumption of a server provided in the present disclosure, the power supply architecture is first optimized, the Efuse not only supplies power to one or more server plug-ins, but also supplies power to one or more other Efuses, thereby reducing the number of current groups. For example, form the beginning, ten groups of Efuses are used to monitor the current, and now it is simplified to use two groups of Efuses to monitor the current, thereby simplifying the test method, reducing the number of test devices, solving the problem of current proportional distribution during the test, and improving the test efficiency.

Moreover, considering the influence of the selection of the IMON resistance on the IMON summation, in the method for monitoring the power consumption of the server provided in the present disclosure, the conversion circuit or the operational amplifier circuit of the Isense and the VSense are also optimized, and the adder, the MOS transistors and the current mirror circuits are removed, thereby reducing the cost and minimizing the difference between boards. In addition, in the present disclosure, a version of the SVID controller is optimized, influence factors such as interference and a voltage drop are compensated through register parameters in the SVID controller, and layout positions of the monitored Efuse and the SVID controller are adjusted to ensure that they are close to each other, thereby further reducing the interference.

A method, an apparatus and a system for monitoring power consumption of a server, an electronic device and a non-transitory readable storage medium provided in the present disclosure will be described in detail through specific embodiments and application scenarios with reference to the accompanying drawings.

Figure 2:
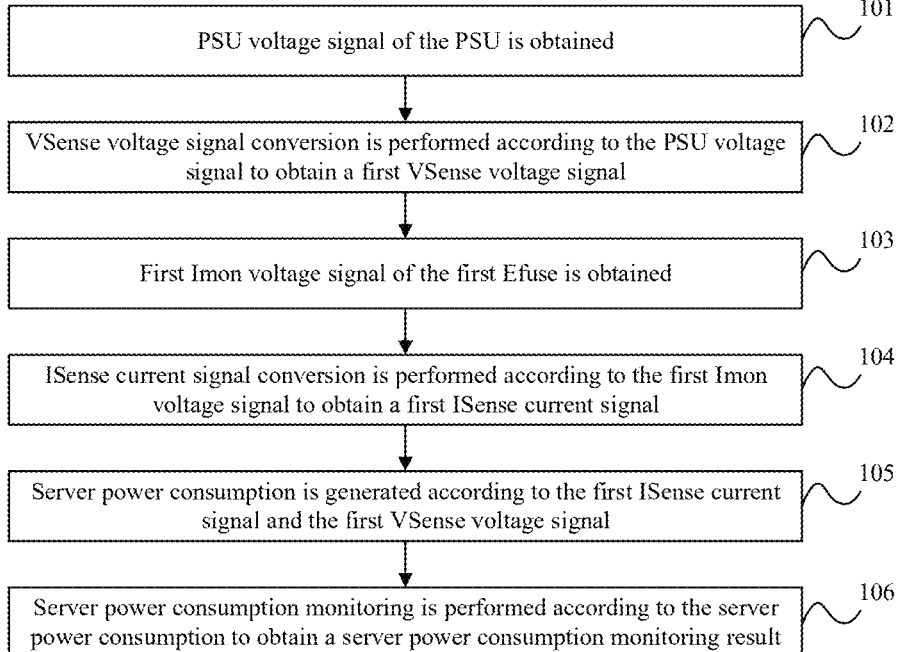
FIG. 2 is a schematic diagram of a method for monitoring power consumption of a server provided in an embodiment of the present disclosure.

An embodiment of the present disclosure relates to a method for monitoring power consumption of a server. As shown in FIG. 2, the method is applied to a system for monitoring power consumption of a server. The system for monitoring the power consumption of the server includes a PSU, a first Efuse, a second Efuse, a first server plug-in and a second server plug-in. The PSU is configured to supply power to the first Efuse, the first Efuse is configured to supply power to the second Efuse and the first server plug-in, and the second Efuse is configured to supply power to the second server plug-in. The method includes:

step 101, a PSU voltage signal of the PSU is obtained;

step 102, VSense voltage signal conversion is performed according to the PSU voltage signal to obtain a first VSense voltage signal;

step 103, a first Imon voltage signal of the first Efuse is obtained;

step 104, ISense current signal conversion is performed according to the first Imon voltage signal to obtain a first ISense current signal;

step 105, server power consumption is generated according to the first ISense current signal and the first VSense voltage signal; and step 106, server power consumption monitoring is performed according to the server power consumption to obtain a server power consumption monitoring result.

In the method for monitoring the power consumption of the server provided in the present disclosure, it is necessary to obtain the PSU voltage signal of the PSU and the first Imon voltage signal of the first Efuse, then respectively perform the ISense current signal conversion and the VSense voltage signal conversion on the first Imon voltage signal and the PSU voltage signal, and the obtained first ISense current signal and the first VSense voltage signal are used as monitoring current and monitoring voltage for overall monitoring of the server, so as to obtain the overall power consumption of the server and perform an overall power consumption monitoring operation of the server.

The first Efuse supplies power to the second Efuse and the first server plug-in at the same time, and the second Efuse supplies power to the second server plug-in. When it is necessary to obtain Imon voltages of the first server plug-in and the second server plug-in in the server, it is only necessary to obtain the first Imon voltage signal corresponding to the first Efuse.

Since the power supply architecture in the technical solution provided in the present disclosure is a mode that one Efuse supplies power to the server plug-in and other Efuses at the same time, the sum of the voltages of the server plug-in and the other Efuse supplied by the Efuse may be obtained by obtaining voltage of the Efuse. During the circuit test, there is no need to distribute the current in proportion to a plurality of Efuses, thereby avoiding the interference of unreasonable distribution on the Imon voltage, simplifying the test difficulty and improving the test accuracy.

In addition, when monitoring the power consumption of the server, it is only necessary to monitor one Efuse, thereby reducing the welding of load lines, reducing the number of load meters, and further reducing the cost of circuit test.

Figure 3:
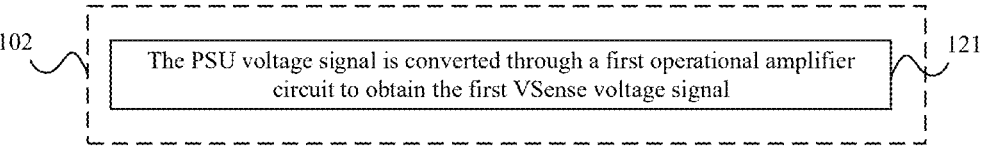
FIG. 3 is a schematic diagram of another method for monitoring power consumption of a server provided in an embodiment of the present disclosure.

In some embodiments, as shown in FIG. 3, in the method for monitoring the power consumption of the server provided in the present disclosure, step 102 includes:

step 121, the PSU voltage signal is converted through a first operational amplifier circuit to obtain the first VSense voltage signal.

In the method for monitoring the power consumption of the server provided in the present disclosure, the first VSense voltage signal can be obtained by processing the PSU voltage signal through the operational amplifier circuit or an operational amplifier.

In some embodiments, as shown in FIG. 4, in the method for monitoring the power consumption of the server provided in the present disclosure, step 104 includes:

step 141, the first Imon voltage signal is converted through a second operational amplifier circuit to obtain the first ISense current signal.

In the method for monitoring the power consumption of the server provided in the present disclosure, the first ISense current signal can be obtained by processing the first Imon voltage signal through the operational amplifier circuit or the operational amplifier.

In some embodiments, as shown in FIG. 5, in the method for monitoring the power consumption of the server provided in the present disclosure, step 121 includes:

step 122, operational amplification processing is performed on the PSU voltage signal through the first operational amplifier circuit to obtain a first operational amplification result; and step 123, conversion processing is performed on the first operational amplification result through a first MOS transistor and a first mirror current source to obtain the first VSense voltage signal.

In the method for monitoring the power consumption of the server provided in the present disclosure, the first VSense voltage signal can be obtained through a circuit conversion manner shown in FIG. 6. For example, an operational amplifier circuit includes a first operational amplifier circuit and a second operational amplifier circuit, which can independently process the PSU voltage signal and the first Imon voltage signal, or can be combined in a module and flow to different pins of a SVID controller respectively. For example, the PSU voltage signal is transmitted to an operational amplifier module to perform operational amplification processing, after the first operational amplification result is obtained, the first operational amplification result is sent to the first MOS transistor for processing, and then sent to the first mirror current source or a first current mirror circuit by the first MOS transistor to convert the PSU voltage signal into the first VSense voltage signal, and finally the first VSense voltage signal is sent to a VSense pin of the SVID controller.

In some embodiments, the voltage signal may be converted into the current signal by operational amplification and conversion, thereby reducing the interference of the PSU voltage signal itself, solving the problem of voltage drop caused by the voltage difference between the PSU and the SVID controller, improving the quality of voltage data transmitted to the SVID controller for monitoring, and ensuring the accuracy of server power consumption monitoring.

In some embodiments, as shown in FIG. 7, in the method for monitoring the power consumption of the server provided in the present disclosure, step 141 includes:

step 142, operational amplification processing is performed on the first Imon voltage signal through the second operational amplifier circuit to obtain a second operational amplification result; and step 143, conversion processing is performed on the second operational amplification result through a second MOS transistor and second mirror current source to obtain the first ISense current signal.

In the method for monitoring the power consumption of the server provided in the present disclosure, the first VSense voltage signal can be obtained through the circuit conversion manner shown in FIG. 6. For example, the operational amplifier circuit includes the first operational amplifier circuit and the second operational amplifier circuit, which can independently process the PSU voltage signal and the first Imon voltage signal, or can be combined in a module and flow to different pins of the SVID controller respectively. For example, the first Imon voltage signal is transmitted to the operational amplifier module to perform operational amplification processing, after the second operational amplification result is obtained, the second operational amplification result is sent to the second MOS transistor for processing, and then sent to the second mirror current source or a second current mirror circuit by the second MOS transistor to convert the first Imon voltage signal into the first ISense current signal, and finally the first ISense current signal is sent to an ISense pin of the SVID controller.

In some embodiments, the voltage signal may be converted into the current signal by operational amplification and conversion, thereby reducing the interference of the first Imon voltage signal itself, solving the problem of voltage drop caused by the voltage difference between the Efuse and the SVID controller, improving the quality of current data transmitted to the SVID controller for monitoring, and ensuring the accuracy of server power consumption monitoring.

In some embodiments, as shown in FIG. 8, in the method for monitoring the power consumption of the server provided in the present disclosure, step 102 includes:

step 124, the PSU voltage signal is sent to a SVID controller; and step 125, the PSU voltage signal is restored through a voltage gain register to obtain the first VSense voltage signal.

The present disclosure further provides a different voltage signal conversion method, which directly sends the PSU voltage signal to the SVID controller without processing the PSU voltage signal through the first operational amplifier circuit. For example, the VSense pin of the SVID controller is directly connected to an endpoint of the output voltage of the PSU, for example, the PSU voltage signal, and then the PSU voltage signal is restored through the voltage gain register set in the SVID controller to obtain the first VSense voltage signal.

In addition, in order to further avoid interference of interference signals on power consumption monitoring, wiring optimization may also be performed on the PSU and the SVID controller, and the distance between the PSU and the SVID controller may be shortened without other components, thereby improving the accuracy of the first VSense voltage signal.

In some embodiments of the present disclosure, influence factors such as interference and voltage drop may be compensated by the voltage gain register, thereby avoiding the problems that too many components are needed when the conversion is performed by the operational amplifiers, the MOS transistors and the mirror current sources, and the differences among different boards are too large and the monitoring effect is poor due to the errors of the components and different matching solutions; and also avoiding problems of excessive demand for components and high monitoring cost.

In some embodiments, as shown in FIG. 9, the SVID controller includes a VSense pin, and the VSense pin is configured to receive the PSU voltage signal. In the method for monitoring the power consumption of the server provided in the present disclosure, after step 124 and before step 125, the method further includes:

step 126, the PSU voltage signal is adjusted through a divider resistance to obtain the PSU voltage signal meeting voltage requirements of the VSense pin.

In the method for monitoring the power consumption of the server provided in the present disclosure, the PSU voltage signal can be adjusted through the divider resistance arranged at the VSense pin of the SVID controller, so as to ensure that the adjusted PSU voltage signal meets the voltage requirements of the SVID controller.

In some embodiments, the divider resistance may perform voltage division processing on the PSU voltage signal to reduce the voltage of the PSU voltage signal, thereby ensuring that the adjusted PSU voltage signal may meet the voltage requirements of the SVID controller, especially the voltage requirements of the VSense pin of the SVID controller, and improving the system stability of the system for monitoring power consumption of the server and the service life of the components.

In some embodiments, as shown in FIG. 10, in the method for monitoring the power consumption of the server provided in the present disclosure, after step 125, the method further includes:

step 127, the first VSense voltage signal is compensated through a voltage compensation register to obtain a compensated first VSense voltage signal.

In the method for monitoring the power consumption of the server provided in the present disclosure, the first VSense voltage signal can be compensated by a voltage offset register in the SVID controller to obtain the compensated first VSense voltage signal.

In some embodiments of the present disclosure, a certain voltage drop generated by the PSU voltage directly connecting to the SVID controller may be compensated through the voltage compensation register, thereby further ensuring the data accuracy of the first VSense voltage signal, and improving the effect of the server power consumption monitoring.

In some embodiments, as shown in FIG. 11, the SVID controller includes an Isense pin, and in the method for monitoring the power consumption of the server provided in the present disclosure, step 141 includes:

step 144, the first Imon voltage signal is sent to the Isense pin of the SVID controller through the second operational amplifier circuit; and step 145, the first Imon voltage signal is corrected through a current gain register to obtain the first ISense current signal.

In the method for monitoring the power consumption of the server provided in the present disclosure, the first Imon voltage signal is first sent to the second operational amplifier circuit for operational amplifier conversion, and after obtaining a relatively large current signal, the amplified current signal is sent to the Isense pin of the SVID controller. Subsequently, the current gain register in the SVID controller corrects the first ISense current signal to obtain the corrected first ISense current signal.

For example, as shown in FIG. 12, the first Imon voltage signal corresponding to the first Efuse is sent to the second operational amplifier circuit, and after voltage-current conversion is performed by the second operational amplifier circuit, the first ISense current signal is sent to the Isense pin of the SVID controller. The second operational amplifier circuit may include an operational amplifier OPA171 and an operational amplifier resistance R3 which are connected in parallel, and is configured to perform operational amplification on the first Imon voltage signal and perform conversion from an ongoing voltage signal to a current signal. The operational amplifier resistance R3 is configured to adjust the voltage and current of the first ISense current signal to ensure that the converted first ISense current signal may meet current requirements of the Isense pin of the SVID controller.

In some embodiments, in the method for monitoring the power consumption of the server provided in the present disclosure, the conversion is performed through the second operational amplifier circuit and the compensation is performed through the current gain register, thereby reducing the number of components required for operational amplification, and avoiding the problems of large difference between different boards and poor power consumption monitoring effect of the server caused by excessive components.

In some embodiments, as shown in FIG. 13, in the method for monitoring the power consumption of the server provided in the present disclosure, after step 145, the method further includes:

step 146, the first ISense current signal is compensated through a current compensation register to obtain a compensated first ISense current signal.

In the method for monitoring the power consumption of the server provided in the present disclosure, the first ISense current signal may also be compensated by the current compensation register, thereby avoiding the problem of inaccurate data when the first Imon voltage signal is transmitted to the SVID controller the second operational amplifier circuit.

In some embodiments, as shown in FIG. 14, the second operational amplifier circuit includes a single operational amplifier. In the method for monitoring the power consumption of the server provided in the present disclosure, step 144 includes:

step 147, the first Imon voltage signal is sent to the Isense pin of the SVID controller through the single operational amplifier.

In the method for monitoring the power consumption of the server provided in the present disclosure, the second operational amplifier circuit may be the single operational amplifier. The first Imon voltage signal is transmitted to the single operational amplifier for operational amplification and conversion, and then transmitted to the Isense pin of the SVID controller by the single operational amplifier.

In some embodiments, since the second operational amplifier circuit is the single operational amplifier, and components such as the adder, the MOS transistors and the current mirror circuit devices are removed, thereby saving the cost for monitoring the power consumption of the server, further reducing the differences among different boards, and improving the accuracy for monitoring the power consumption of the server.

In some embodiments, as shown in FIG. 15, the system for monitoring the power consumption of the server further includes a third Efuse, a fourth Efuse, a third server plug-in and a fourth server plug-in. The PSU is configured to supply power to the third Efuse, the third Efuse is configured to supply power to the fourth Efuse and the third server plug-in, and the fourth Efuse is configured to supply power to the fourth server plug-in. In the method for monitoring the power consumption of the server provided in the present disclosure, after step 103, the method further includes:

step 107, a third Imon voltage signal of the third Efuse is obtained;

step 108, a fifth Imon voltage signal is obtained according to the first Imon voltage signal and the third Imon voltage signal;

step 109, ISense current signal conversion is performed according to the fifth Imon voltage signal to obtain a second ISense current signal;

step 110, second server power consumption is generated according to the first VSense voltage signal and the second ISense current signal; and step 111, server power consumption monitoring is performed according to the second server power consumption to obtain a second server power consumption monitoring result.

Figures 16, 17, 18, 19:
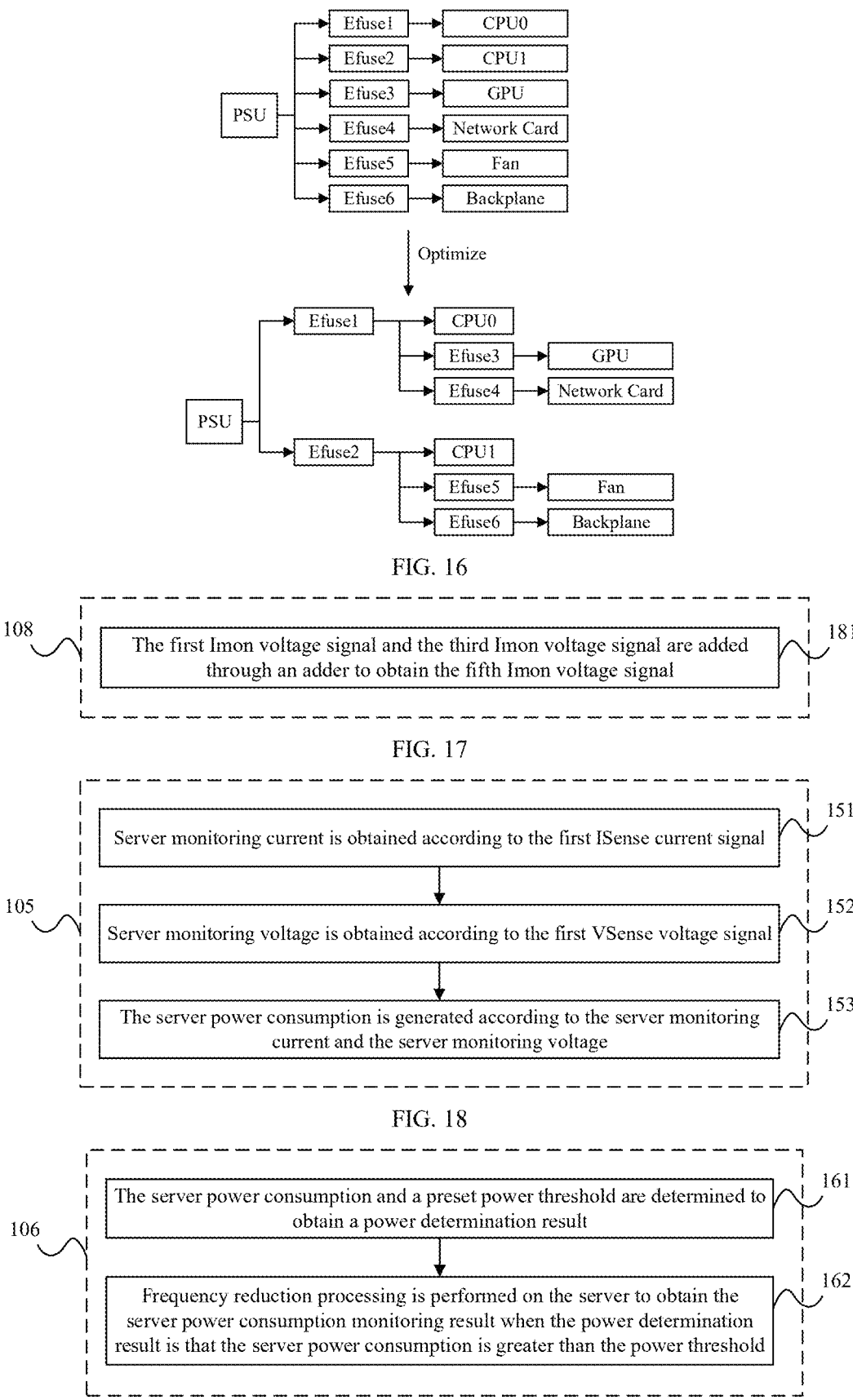
FIG. 16 is an example of a power supply framework optimization provided in the present disclosure.
FIG. 17 is a schematic diagram of yet another method for monitoring power consumption of a server provided in an embodiment of the present disclosure.
FIG. 18 is a schematic diagram of yet another method for monitoring power consumption of a server provided in an embodiment of the present disclosure.
FIG. 19 is a schematic diagram of yet another method for monitoring power consumption of a server provided in an embodiment of the present disclosure.

As shown in FIG. 16, in the method for monitoring the power consumption of the server provided in the present disclosure, a plurality of Efuses may be connected in series, where each of the plurality of Efuses supplies power to another Efuse and a server plug-in; or the plurality of Efuses may be connected in series and parallel. For example, there are six Efuses, namely, Efuse1 supplying power to CPU0, Efuse2 supplying power to CPU1, Efuse3 supplying power to GPU, Efuse4 supplying power to a network card, Efuse5 supplying power to a fan, and Efuse6 supplying power to a backplane. In the method for monitoring the power consumption of the server provided in the present disclosure, the power supply of six server plug-ins may be realized by the PSU supplying power to the Efuse1, the Efuse1 supplying power to the Efuse2 and the CPU0, and the Efuse2 supplying power to the CPU1 and the Efuse3. It can also be three MP5991 connected in parallel. The PSU supplies power to the Efuse1 and the Efuse2, the Efuse1 supplies power to the CPU0, the Efuse3 and the Efuse4 at the same time, the Efuse3 supplies power to the GPU, and the Efuse4 supplies power to the network card, the Efuse2 supplies power to the CPU1, the Efuse5 and the Efuse6 at the same time, the Efuse5 supplies power to the fan, and Efuse6 supplies power to the backplane. At this time, the overall power consumption of the server may be obtained by monitoring the Efuse1 and the Efuse2.

In some embodiments, as shown in FIG. 17, in the method for monitoring the power consumption of the server provided in the present disclosure, step 108 includes:

step 181, the first Imon voltage signal and the third Imon voltage signal are added through an adder to obtain the fifth Imon voltage signal.

In the method for monitoring the power consumption of the server provided in the present disclosure, the first Imon voltage signal and the third Imon voltage signal may be added by the adder to obtain the fifth Imon voltage signal.

In addition, as shown in FIG. 12, in the present disclosure, IMON signals of two Efuses may be respectively connected to an operational amplifier input end of a second operational amplifier circuit through two identical resistances. The first Imon or an Imon1 corresponding to the Efuse1 or the first Efuse needs to be preprocessed by an Imon resistance R1 before being input into the second operational amplifier circuit, while the third Imon or an Imon2 corresponding to the Efuse2 or the third Efuse also needs to be preprocessed by the Imon resistance R2 before being input into the second operational amplifier circuit.

For example, the selection of R1 and R2 may be realized in the following manners.

If a resistance of an Imon pin of one MP5991 is 2 kΩ, for the Efuse of two MP5991 connected in parallel, Imon pins of the two MP5991 need to be connected together, and then a 2K Imon resistance may be shared with the ground. Three MP5991 are the same, which ensures that coefficient of converting current into voltage is the same. When the Imon resistances of two groups of Efuses are selected correctly, the error of the sum of the Imon voltages of two Efuses may be reduced, and the influence of the proportional distribution of the load current during the test on test results may be minimized, thereby improving the accuracy of server power consumption monitoring.

In some embodiments, as shown in FIG. 18, in the method for monitoring the power consumption of the server provided in the present disclosure, step 105 includes:

step 151, a server monitoring current is obtained according to the first ISense current signal;

step 152, a server monitoring voltage is obtained according to the first VSense voltage signal; and step 153, the server power consumption is generated according to the server monitoring current and the server monitoring voltage.

The PSU voltage is converted into a voltage signal VSense through an operational amplifier circuit, and the voltage signal VSense is sent to the Vsense pin of the SVID controller as a monitored voltage V1. Subsequently, after internal calculation, the SVID controller obtains overall power consumption as P1=V1*I1, and the overall power obtained at this time is the current power consumption of the server.

In some embodiments, in the method for monitoring the power consumption of the server provided in the present disclosure, the first server plug-in includes at least one of a central processing unit (CPU), a graphics processing unit (GPU), a network card, a fan or a backplane.

The first server plug-in may be a plug-and-play device, for example, the CPU, the GPU, the network card, the fan, a board card, and the like. The present disclosure may realize the overall statistics and monitoring of the above plug-ins in the server.

In some embodiments, as shown in FIG. 19, the first server plug-in is the CPU. In the method for monitoring the power consumption of the server provided in the present disclosure, step 106 includes:

step 161, the server power consumption and a preset power threshold are determined to obtain a power determination result; and step 162, frequency reduction processing is performed on the server to obtain the server power consumption monitoring result when the power determination result is that the server power consumption is greater than the power threshold.

The SVID controller stores corresponding information in the VSense register and the ISense register, and may directly read a value of a power register PSense and directly send the value to the CPU, so as to realize frequency reduction when the power consumption suddenly increases to a threshold, thereby protecting the PSU from downtime.

Figure 20:
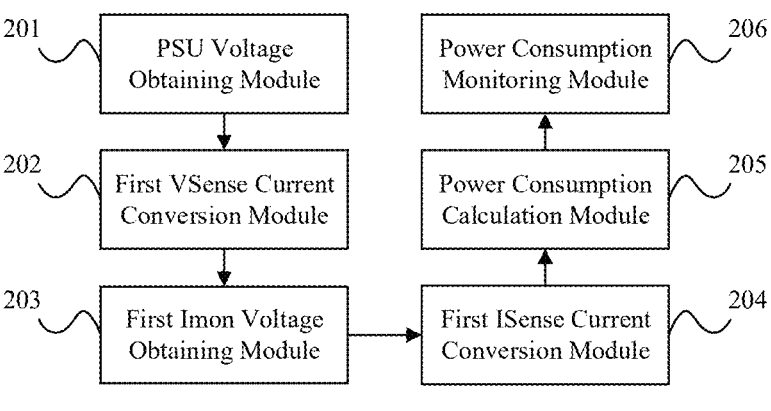
FIG. 20 is schematic diagram of an apparatus for monitoring power consumption of a server provided in an embodiment of the present disclosure.

An embodiment of the present disclosure further provides an apparatus for monitoring power consumption of a server. As shown in FIG. 20, the apparatus includes:

a PSU voltage obtaining module 201 configured to obtain a PSU voltage signal of a PSU;

a first VSense voltage conversion module 202 configured to perform VSense voltage signal conversion according to the PSU voltage signal to obtain a first VSense voltage signal;

a first Imon voltage obtaining module 203 configured to obtain a first Imon voltage signal of a first Efuse;

a first ISense current conversion module 204 configured to perform ISense current signal conversion according to the first Imon voltage signal to obtain a first ISense current signal;

a power consumption calculation module 205 configured to generate server power consumption according to the first ISense current signal and the first VSense voltage signal; and a power consumption monitoring module 206 configured to perform server power consumption monitoring according to the server power consumption to obtain a server power consumption monitoring result.

In some embodiments, in the apparatus for monitoring the power consumption of the server provided in the present disclosure, the first VSense voltage conversion module 202 includes:

a first operational amplifier conversion unit configured to convert the PSU voltage signal through a first operational amplifier circuit to obtain the first VSense voltage signal.

In some embodiments, in the apparatus for monitoring the power consumption of the server provided in the present disclosure, the first ISense current conversion module 204 includes:

a second operational amplifier conversion unit configured to convert the first Imon voltage signal through a second operational amplifier circuit to obtain the first ISense current signal.

In some embodiments, in the apparatus for monitoring the power consumption of the server provided in the present disclosure, the first operational amplifier conversion unit includes:

a first operational amplification unit configured to perform operational amplification processing on the PSU voltage signal through the first operational amplifier circuit to obtain a first operational amplification result; and a first MOS conversion unit configured to perform conversion processing on the first operational amplification result through a first MOS transistor and a first mirror current source to obtain the first VSense voltage signal.

In some embodiments, in the apparatus for monitoring the power consumption of the server provided in the present disclosure, the second operational amplifier conversion unit includes:

a second operational amplification unit configured to perform operational amplification processing on the first Imon voltage signal through the second operational amplifier circuit to obtain a second operational amplification result; and a second MOS conversion unit configured to perform conversion processing on the second operational amplification result through a second MOS transistor and second mirror current source to obtain the first ISense current signal.

In some embodiments, in the apparatus for monitoring the power consumption of the server provided in the present disclosure, the first operational amplifier conversion unit includes:

a PSU voltage sending unit configured to send the PSU voltage signal to a SVID controller through the first operational amplifier circuit; and a PSU voltage restoring unit configured to restore the PSU voltage signal through a voltage gain register to obtain the first VSense voltage signal.

In some embodiments, in the apparatus for monitoring the power consumption of the server provided in the present disclosure, the first operational amplifier conversion unit further includes:

a divider resistance adjusting unit configured to adjust the PSU voltage signal through a divider resistance to obtain the PSU voltage signal meeting voltage requirements of the VSense pin.

In some embodiments, in the apparatus for monitoring the power consumption of the server provided in the present disclosure, the first operational amplifier conversion unit further includes:

a voltage compensation unit configured to compensate the first VSense voltage signal through a voltage compensation register to obtain a compensated first VSense voltage signal.

In some embodiments, in the apparatus for monitoring the power consumption of the server provided in the present disclosure, the second operational amplifier conversion unit includes:

an Imon voltage sending unit configured to send the first Imon voltage signal to the Isense pin of the SVID controller through the second operational amplifier circuit; and an Imon voltage correcting unit configured to correct the first Imon voltage signal through a current gain register to obtain the first ISense current signal.

In some embodiments, in the apparatus for monitoring the power consumption of the server provided in the present disclosure, the second operational amplifier conversion unit further includes:

a first ISense current compensation unit configured to compensate the first ISense current signal through a current compensation register to obtain a compensated first ISense current signal.

In some embodiments, in the apparatus for monitoring the power consumption of the server provided in the present disclosure, the Imon voltage sending unit includes:

a single operational amplifier sending unit configured to send the first Imon voltage signal to the Isense pin of the SVID controller through the single operational amplifier.

In some embodiments, the apparatus for monitoring the power consumption of the server provided in the present disclosure further includes:

a third Imon voltage obtaining module configured to obtain a third Imon voltage signal of the third Efuse;

a fifth Imon voltage obtaining module configured to obtain a fifth Imon voltage signal according to the first Imon voltage signal and the third Imon voltage signal;

a second VSense voltage conversion module configured to perform ISense current signal conversion according to the fifth Imon voltage signal to obtain a second ISense current signal;

a second power consumption calculation module configured to generate second server power consumption according to the first VSense voltage signal and the second ISense current signal; and a second power consumption monitoring module configured to perform server power consumption monitoring according to the second server power consumption to obtain a second server power consumption monitoring result.

In some embodiments, in the apparatus for monitoring the power consumption of the server provided in the present disclosure, the fifth Imon voltage obtaining module includes:

a voltage adding unit configured to add the first Imon voltage signal and the third Imon voltage signal through an adder to obtain the fifth Imon voltage signal.

In some embodiments, in the apparatus for monitoring the power consumption of the server provided in the present disclosure, the power consumption calculation module 205 includes:

a server monitoring current obtaining unit configured to obtain a server monitoring current according to the first ISense current signal;

a server monitoring voltage obtaining unit configured to obtain a server monitoring voltage according to the first VSense voltage signal; and a server power consumption generating unit configured to generate the server power consumption according to the server monitoring current and the server monitoring voltage.

In some embodiments, in the apparatus for monitoring the power consumption of the server provided in the present disclosure, the first server plug-in includes at least one of a central processing unit (CPU), a graphics processing unit (GPU), a network card, a fan or a backplane.

In some embodiments, in the apparatus for monitoring the power consumption of the server provided in the present disclosure, the power consumption monitoring module 206 includes:

a power consumption determining unit configured to determine the server power consumption and a preset power threshold to obtain a power determination result; and a frequency reduction processing unit configured to perform frequency reduction processing on the server to obtain the server power consumption monitoring result when the power determination result is that the server power consumption is greater than the power threshold.

An embodiment of the present disclosure further provides a system for monitoring power consumption of a server. The system includes:

a PSU module configured to supply power to a first Efuse module, and send a PSU voltage signal to a first operational amplifier circuit conversion module;

the first Efuse module configured to supply power to a second Efuse module and a first server plug-in, and send a first Imon voltage signal to a second operational amplifier circuit conversion module, where the first Imon voltage signal includes a second Imon voltage signal corresponding to the second Efuse module and a third Imon voltage signal corresponding to the first server plug-in;

the second Efuse module configured to supply power to a second server plug-in;

the first operational amplifier circuit conversion module configured to perform VSense voltage signal conversion on the PSU voltage signal to obtain a first VSense voltage signal, and send the first VSense voltage signal to a SVID controller;

the second operational amplifier circuit conversion module configured to perform ISense current signal conversion on the first Imon voltage signal to obtain a first ISense current signal, and send the first ISense current signal to the SVID controller; and the SVID controller configured to generate first server power consumption according to the first ISense current signal and the first VSense voltage signal, and monitor the first server power consumption to obtain a first server power consumption monitoring result.

Figure 21:
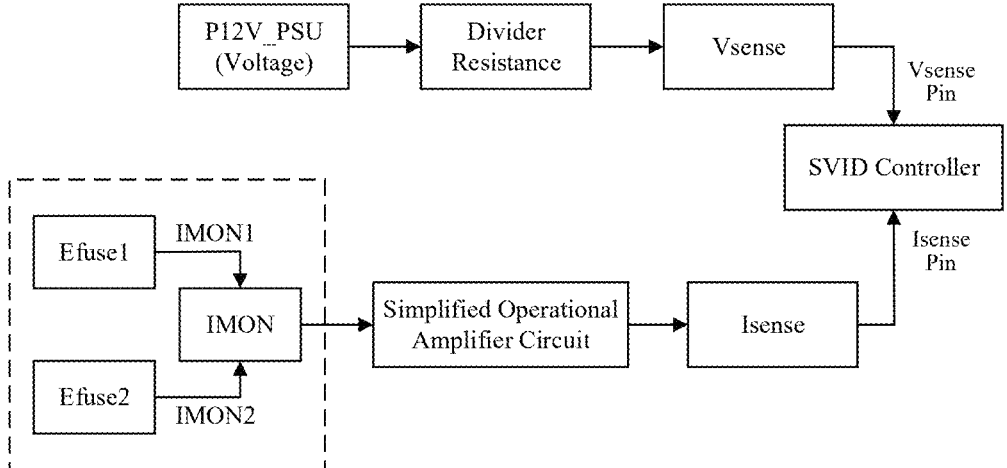
FIG. 21 is schematic diagram of a system for monitoring power consumption of a server provided in an embodiment of the present disclosure.

As shown in FIG. 21, compared with FIG. 1, in the present disclosure, the power supply architecture is improved at first, the original multiple Efuses connected in parallel are replaced by the Efuse1 to supply power to the CPU and other two Efuses, and the Efuse2 is the same. Therefore, it is necessary to meet the power requirements in the selection of the Efuse1 and the Efuse2, for example, a solution of three MP5991 in parallel is selected. When monitoring the overall power consumption, it is only necessary to monitor the Efuse1 and the Efuse2, and thus the welding of load lines may be reduced, the number of load meters may be reduced, and the difficulty of proportional distribution of load current may be reduced during the test.

Secondly, aiming at the first operational amplifier circuit and the second operational amplifier circuit, and aiming at the existing technical solution of converting voltage signals into current signals by using the adder, the operational amplifiers, the MOS transistors and the current mirror circuits, since there are errors in components, the more components there are, the greater the difference between boards, and the higher the cost. The wiring positions of the monitored Efuse and the SVID controller are optimized, so that the monitored Efuse and the SVID controller are as close as possible, and two signals are far away from interference signals. The version of the SVID controller is optimized, and these factors are compensated through register parameters in the SVID controller.

For the transmission path of the PSU voltage signal, Vsense is directly is directly connected to an endpoint of the output voltage of the PSU, and a divider resistance is arranged at the VSense pin of the SVID controller, so that the Vsense voltage may meet voltage requirements of the pin of the SVID controller, and then the Vsense voltage is restored through a gain register in the SVID controller. The operational amplifiers, the MOS transistors, the current mirror circuit devices are deleted. Since the PSU voltage directly to the SVID controller will produce a certain voltage drop, it can be compensated by the offset register in the SVID controller at this time. Layout wiring needs to consider the positions of EFUSE and the SVID controller to minimize the interference to Vsense.

For the transmission path of the Efuse voltage signal, IMON signals of two Efuses are respectively connected to an operational amplifier input end through two identical resistances, which are converted into relatively large voltage signals through the operational amplifier and then sent to the Isense pin of the SVID controller. The current OFFSET register and current gain register in the SVID controller can correct Isense. The selection of operational amplifier resistances also needs to be noted to ensure that the Isense voltage meets the voltage requirements of the pin of the SVID controller. In this current monitoring solution, the adder, the MOS transistors and the current mirror circuit devices may be removed, and the operational amplifier circuits (operational amplifiers) may be replaced by a single operational amplifier device, thereby saving the cost and reducing the differences among boards.

A relationship between an IMON voltage of an Efuse and an actual load current is illustrated by taking MP5991 as an example. A load meter is used to actually load current of 10 A, a resistance of an Imon pin of the MP5991 is 2 k$\Omega$, and a measured Imon voltage is 200 mV. Based on the formula I=(V(mV)/R(k$\Omega$))*10 uA/A, it can be concluded that an actual Sense of the Efuse is 10 A.

The selection of the IMON resistance of the Efuse is very important. If a resistance of an Imon pin of one MP5991 is 2 k$\Omega$, for the Efuse of two MP5991 connected in parallel, Imon pins of the two MP5991 need to be connected together, and then a 2K Imon resistance may be shared with the ground. Three MP5991 are the same, which ensures that coefficient of converting current into voltage is the same. When the IMON resistances of two groups of Efuses are selected correctly, the error of the sum of the IMON voltages of two Efuses may be reduced, and the influence of the proportional distribution of the load current during the test on test results may be minimized.

Finally, the SVID controller stores corresponding information in the VSense register and the ISense register, and may directly read a value of a power register PSense and directly send the value to the CPU, so as to realize frequency reduction when the power consumption suddenly increases to a threshold, thereby protecting the PSU from downtime.

Figure 22:
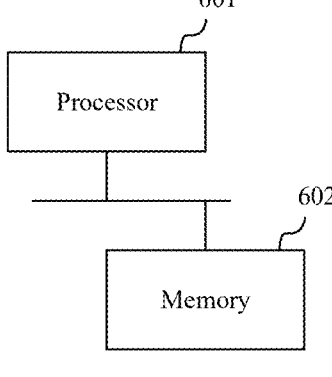
FIG. 22 is a structural schematic diagram of an electronic device provided in an embodiment of the present disclosure.

An embodiment of the present disclosure further provides an electronic device. As shown in FIG. 22, the electronic device includes:

at least one processor 601; and a memory 602 communicatively connected to the at least one processor 601, where the memory 602 stores instructions executable by the at least one processor 601, when executed by the at least one processor 601, the instructions cause the at least one processor 601 to implement the method for monitoring the power consumption of the server provided in the embodiment of the present disclosure.

The memory and the processor are connected through a bus, which include any number of interconnected buses and bridges, and the bus connects one or more processors and various circuits of the memory together. The bus can also connect various other circuits, for example, peripheral devices, voltage regulators and power management circuits, which are well known in the art, and therefore, will not be described further here. A bus interface provides an interface between the bus and a transceiver. The transceiver can be one element or multiple elements, for example, multiple receivers and transmitters, which provide a unit for communicating with various other devices over a transmission medium. The data processed by the processor is transmitted over the wireless medium through the antenna, which further receives the data and transmits the data to the processor.

The processor is responsible for managing the bus and general processing, and can also provide various functions including timing, peripheral interfaces, voltage regulation, power management and other control functions. The memory can be used to store data used by the processor when performing operations.

An embodiment of the present disclosure further provides a non-transitory readable storage medium storage medium storing a computer program. When executed by a processor, the computer program causes the processor to implement the method for monitoring power consumption of the server in embodiment of the present disclosure.

That is, a person skilled in the art can understand that all or part of the steps in the method according to the above embodiments can be completed by instructing related hardware through a program, which is stored in a storage medium and includes several instructions to enable a device (which can be a single chip, a chip, or the like) or a processor to perform all or part of the steps in the method according to the embodiments of the present disclosure. The aforementioned storage medium includes: an universal serial bus (USB) flash disk, a mobile hard disk drive, a read-only memory (ROM), a random access memory (RAM), a magnetic disk or an optical disk, and various media that can store program codes.

Other embodiments of the present disclosure will be readily apparent to person skilled in the art after considering the specification and practicing the present disclosure herein. The present disclosure is intended to cover any variations, uses or adaptations of the present disclosure, which follow general principles of the present disclosure and include common knowledge or customary technical means in the technical field not disclosed in the present disclosure. The specification and embodiments are to be regarded as exemplary only, with the true scope and spirit of the present disclosure indicated by the following claims.

It should be understood that the present disclosure is not limited to the precise structure that has been described above and shown in the drawings, and various modifications and changes can be made without departing from its scope. The scope of the present disclosure is limited only by the appended claims.

The invention claimed is:

1. A method for monitoring power consumption of a server having at least one of a first group of plug-in servers, applied to a system for monitoring power consumption of the server, wherein the first group comprises a computer power supply unit, a first one-time programmable memory, a second one-time programmable memory, a first server plug-in and a second server plug-in, wherein the computer power supply unit is configured to supply power to the first one-time programmable memory, the first one-time programmable memory is configured to supply power to the second one-time programmable memory and the first server plug-in at the same time, so as to reduce a number of groups to be monitored, and the second one-time programmable memory is configured to supply power to the second server plug-in, and the method comprises:

obtaining a power supply voltage signal of the computer power supply unit;

performing sampling voltage signal conversion according to the power supply voltage signal to obtain a first sampling voltage signal;

obtaining a first analog output voltage signal of the first one-time programmable memory;

performing sampling current signal conversion according to the first analog output voltage signal to obtain a first sampling current signal;

generating server power consumption according to the first sampling current signal and the first sampling voltage signal; and performing server power consumption monitoring according to the server power consumption to obtain a server power consumption monitoring result.

2. The method according to claim 1, wherein performing the sampling voltage signal conversion according to the power supply voltage signal to obtain the first sampling voltage signal comprises:

converting the power supply voltage signal through a first operational amplifier circuit to obtain the first sampling voltage signal.

3. The method according to claim 2, wherein performing the sampling current signal conversion according to the first analog output voltage signal to obtain the first sampling current signal comprises:

converting the first analog output voltage signal through a second operational amplifier circuit to obtain the first sampling current signal.

4. The method according to claim 2, wherein converting the power supply voltage signal through the first operational amplifier circuit to obtain the first sampling current signal comprises:

performing operational amplification processing on the power supply voltage signal through the first operational amplifier circuit to obtain a first operational amplification result; and performing conversion processing on the first operational amplification result through a first field effect transistor and a first mirror current source to obtain the first sampling voltage signal.

5. The method according to claim 3, wherein converting the first analog output voltage signal through the second operational amplifier circuit to obtain the first sampling current signal comprises:

performing operational amplification processing on the first analog output voltage signal through the second operational amplifier circuit to obtain a second operational amplification result; and performing conversion processing on the second operational amplification result through a second field effect transistor and a second mirror current source to obtain the first sampling current signal.

6. The method according to claim 3, wherein performing the sampling voltage signal conversion according to the power supply voltage signal to obtain the first sampling voltage signal comprises:

sending the power supply voltage signal to a serial voltage identification controller; and restoring the power supply voltage signal through a voltage gain register to obtain the first sampling voltage signal.

7. The method according to claim 6, wherein the serial voltage identification controller comprises a sampling voltage pin, wherein the sampling voltage pin is configured to receive the power supply voltage signal, and after sending the power supply voltage signal to the serial voltage identification controller through the first operational amplifier circuit and before restoring the power supply voltage signal through a preset voltage gain register to obtain the first sampling voltage signal, the method further comprises:

adjusting the power supply voltage signal through a divider resistance to obtain a power supply voltage signal meeting voltage requirements of the sampling voltage pin.

8. The method according to claim 6, wherein after restoring the power supply voltage signal through a preset voltage gain register to obtain the first sampling voltage signal, the method further comprises:

compensating the first sampling voltage signal through a voltage compensation register to obtain a compensated first sampling voltage signal.

9. The method according to claim 7, wherein the serial voltage identification controller comprises a sampling current pin, and converting the first analog output voltage signal through the second operational amplifier circuit to obtain the first sampling current signal comprises:

sending the first analog output voltage signal to the sampling current pin of the serial voltage identification controller through the second operational amplifier circuit; and correcting the first analog output voltage signal through a current gain register to obtain the first sampling current signal.

10. The method according to claim 9, wherein after correcting the first analog output voltage signal through the current gain register to obtain the first sampling current signal, the method further comprises:

compensating the first sampling current signal through a current compensation register to obtain a compensated first sampling current signal.

11. The method according to claim 9, wherein the second operational amplifier circuit comprises a single operational amplifier, and sending the first analog output voltage signal to the sampling current pin of the serial voltage identification controller through the second operational amplifier circuit comprises:

sending the first analog output voltage signal to the sampling current pin of the serial voltage identification controller through the single operational amplifier.

12. The method according to claim 1, wherein the system for monitoring power consumption of the server further comprises a second group of plug-in servers, wherein the second group comprises a third one-time programmable memory, a fourth one-time programmable memory, a third server plug-in and a fourth server plug-in, wherein the computer power supply unit is configured to supply power to the third one-time programmable memory, the third one-time programmable memory is configured to supply power to the fourth one-time programmable memory and the third server plug-in at the same time, and the fourth one-time programmable memory is configured to supply power to the fourth server plug-in, and after obtaining the first analog output voltage signal of the first one-time programmable memory, the method further comprises:

obtaining a third analog output voltage signal of the third one-time programmable memory;

obtaining a fifth analog output voltage signal according to the first analog output voltage signal and the third analog output voltage signal;

performing sampling current signal conversion according to the fifth analog output voltage signal to obtain a second sampling current signal;

generating second server power consumption according to the first sampling voltage signal and the second sampling current signal; and performing server power consumption monitoring according to the second server power consumption to obtain a second server power consumption monitoring result.

13. The method according to claim 12, wherein obtaining the fifth analog output voltage signal according to the first analog output voltage signal and the third analog output voltage signal comprises:

adding the first analog output voltage signal and the third analog output voltage signal through an adder to obtain the fifth analog output voltage signal.

14. The method according to claim 1, wherein generating the server power consumption according to the first sampling current signal and the first sampling voltage signal comprises:

obtaining a server monitoring current according to the first sampling current signal;

obtaining a server monitoring voltage according to the first sampling voltage signal; and generating the server power consumption according to the server monitoring current and the server monitoring voltage.

15. The method according to claim 1, wherein the first server plug-in comprises at least one of a central processing unit (CPU), a graphics processing unit (GPU), a network card, a fan or a backplane.

16. The method according to claim 15, wherein the first server plug-in is the CPU, and performing the server power consumption monitoring according to the server power consumption to obtain the server power consumption monitoring result comprises:

determining the server power consumption and a preset power threshold to obtain a power determination result; and performing frequency reduction processing on the server to obtain the server power consumption monitoring result when the power determination result is that the server power consumption is greater than the power threshold.

17. An electronic device, comprising a processor and a memory, wherein the memory stores programs or instructions for running on the processor, and the programs or instructions, when executed by the processor, cause the processor to implement the method for monitoring power consumption of the server according to claim 1.

18. A non-transitory readable storage medium storing a computer program, wherein the computer program, when executed by a processor, causes the processor to implement the method for monitoring power consumption of the server according to claim 1.

19. The electronic device according to claim 17, wherein the processor is further configured to implement operations comprising:

converting the power supply voltage signal through a first operational amplifier circuit to obtain the first sampling voltage signal.

20. A system for monitoring power consumption of a server, comprising at least one of a first group of plug-in servers having:

a computer power supply unit module configured to supply power to a first one-time programmable memory module, and send a power supply voltage signal to a first operational amplifier circuit conversion module;

the first one-time programmable memory module configured to supply power to a second one-time programmable memory module and a first server plug-in at the same time, so as to reduce a number of groups to be monitored, and send a first analog output voltage signal to a second operational amplifier circuit conversion module, wherein the first analog output voltage signal comprises a second analog output voltage signal corresponding to the second one-time programmable memory module and a third analog output voltage signal corresponding to the first server plug-in;

the second one-time programmable memory module configured to supply power to a second server plug-in;

the first operational amplifier circuit conversion module configured to perform sampling voltage signal conversion on the power supply voltage signal to obtain a first sampling voltage signal, and send the first sampling voltage signal to a serial voltage identification controller;

the second operational amplifier circuit conversion module configured to perform sampling current signal conversion on the first analog output voltage signal to obtain a first sampling current signal, and send the first sampling current signal to the serial voltage identification controller; and the serial voltage identification controller configured to generate first server power consumption according to the first sampling current signal and the first sampling voltage signal, and monitor the first server power consumption to obtain a first server power consumption monitoring result.

* * * * *